US006615769B2

(12) United States Patent
Zhioua

(10) Patent No.: US 6,615,769 B2
(45) Date of Patent: Sep. 9, 2003

(54) METHOD AND DEVICE FOR AUTOMATED APPLICATION AND SELF-TREATMENT OF ANIMALS WITH ECTOPARASITICIDES

(76) Inventor: Elyes Zhioua, 3 O'Keefe Dr., Woodriver Junction, RI (US) 02894

( * ) Notice: Subject to any disclaimer, the term of this patent is extended or adjusted under 35 U.S.C. 154(b) by 0 days.

(21) Appl. No.: 09/873,050

(22) Filed: Jun. 4, 2001

(65) Prior Publication Data

US 2002/0179020 A1 Dec. 5, 2002

(51) Int. Cl.[7] .............................................. A01K 29/00
(52) U.S. Cl. ...................................... 119/666; 119/657
(58) Field of Search ................................. 119/650, 651, 119/665, 666, 667, 669, 656, 657, 658, 604

(56) References Cited

U.S. PATENT DOCUMENTS

| | | | | |
|---|---|---|---|---|
| 3,699,928 A | * | 10/1972 | Cowan | 119/667 |
| 4,987,861 A | * | 1/1991 | Lemire et al. | 119/667 |
| 5,785,004 A | * | 7/1998 | Hobbs | 119/651 |
| 5,988,113 A | * | 11/1999 | Zhioua et al. | 119/657 |
| 6,029,610 A | * | 2/2000 | Ramsey et al. | 119/651 |
| 6,230,660 B1 | * | 5/2001 | Greeson | 119/656 |

* cited by examiner

Primary Examiner—Peter M. Poon
Assistant Examiner—Kimberly S. Smith
(74) Attorney, Agent, or Firm—Cristina M Offenberg, Esq.

(57) ABSTRACT

A method and a device for controlling ectoparasites on animals are disclosed. The method consists of the design of an enclosure with an opening having bait such as food or water within the enclosure. An automatic spraying device is set at the opening. Animals are attracted to walk through the opening to feed or drink. Animals are self-treated with ectoparasiticides every time they enter or exit the enclosure. This method will eliminate the necessary labor to gather animals to be treated individually. The method and device is portable and can be place at any location on a farm or land. The automatic spraying device will provide the necessary dosage of ectoparasiticides on animals to control ectoparasites.

8 Claims, 5 Drawing Sheets

METHOD AND DEVICE FOR AUTOMATED APPLICATION AND SELF-TREATMENT OF ANIMALS WITH ECTOPARASITICIDES

BACKGROUND OF THE INVENTION

1. Field of the Invention

This invention relates to a method and a device for controlling ectoparasites on animals. More particularly, animals are attracted to walk through a passageway and are automatically sprayed by an electronically controlled spraying device.

2. Previous Art

The livestock industry as well as horse owners suffer tremendous loss as a result of ectoparasite infestation (such as flies, lice, grubs, ticks). In the United State, loss in the cattle industry as regards for weight gain caused by horn lies and milk production caused by stable flies, a haematophagous parasite is estimated to $1 billion/year. During the year 2000, twenty-nine horses were killed by the West-Nile virus, which is transmitted by mosquitoes. All cases occurred in the Northeast.

The season of activity of ectoparasites lasts from 3 to 12 months. Therefore, it is costly, time-demanding and labor intensive to treat cattle or horses during the horn fly season. There is no effective means of controlling ectoparasites effecting pastured animals. A procedure has been implemented to control ectoparasites effectively by applicant.

Insecticide impregnated ear tags intended, as their name implies, to be attached to the animal's ear and to release an active substance over a longer or shorter period have also been proposed. These tags consist of a matrix, usually a plastic matrix, which incorporates the active substance and is able to release it over time. The aim of these ear tags is thus, theoretically, to ensure long-lasting protections.

However, despite the claims, ear tags do not display the efficacy required to ensure that the ectoparasites are controlled. The reason for this may be the low activity of the active substance included in the matrix. Another reason may be the accelerated degradation of these active substances under the effect of climatic factors, such as light, heat and rain. Lastly, the control of the release of the active substance from the matrix is widely over-evaluated. The release generally proves to be difficult and variable, and it may depend highly on the manufacturing conditions, which may vary from one batch to another, and on the conditions of use, in particular climatic variations, and especially humidity and temperature, etc. In addition, only a relatively small amount of the active substance incorporated is actually released and it proves to be difficult to be able to control and optimize its release. The intensive use of ear tags induced the development of resistance to insecticides by horn flies and other ectoparasites and the maximum protection is about eight weeks of effective control. Additionally, ear tags are effective against only some ectoparasites such as horn fly but not against stable fly. It is costly and labor intensive to place two ear tags per cattle and they need to be replaced every eight weeks.

Control of ectoparasites has proven to be difficult. One form of control is to treat animals in mass manual spray devices. This process is laborious, time consuming and expensive, particularly when dealing with large herds. The animals are herded to an area while either entering or exiting particular areas, such as milking parlors, shearing stalls, feeding stalls, etc. Most sprayer types are permanently fixed. This prevents a farmer from locating the sprayer at different locations on the facility which may be more advantageous for the farmer.

Another form may consist of a dipping vat. The treatment solution must be changed at specified intervals to maintain efficacy of the treatment solution after several animals pass through the vat. Also, different types of flies require different types of treatment and prevention products and therefore different degrees of management. If the vat is not changed and re-charged accordingly, the efficacy of the treatment solution is greatly reduced. If the vats are not properly managed, the animals receive little or no benefit from the treatment solution.

In summary, Applicant has found that improper management, all greatly reduce the efficacy and cost effectiveness of prior art. Therefore, there is a great need for a method and device to provide more effective application of treatment solutions that are easy to use, even for producers having large herds.

Devices with various mechanisms that trigger automatic spraying of animals such as U.S. Pat. Nos. 5,063,880 and 3,884,192 are designed for animal treatment. Each of these patents are designed to spray the entire body of an animal with a small amount of insecticides, such as insecticides or disinfectants for controlling cattle grubs, face flies, stable flies, and lice. The devices are not efficient for use with disease prevention and treatment solutions because they are not portable and require hard wiring to run. Additionally, too much insecticide is harmful to the environment.

Additionally, these devices are unsuitable for treating dairy cattle because they will allow chemicals to cover the udder of an animal. If the udder is sprayed with insecticides or disinfectants, the likelihood of residuals contaminating the milk produced is increased. Also it requires labor to gather the animals and lead them to pass through these devices.

What is needed is a device which 1) is highly effective for treating ectoparasites on animals; 2) can fulfill the above functions in a voluntary manner without herding the animals to reduce the cost; 3) is easy for producers and breeders to use and requires little maintenance; 4) is easy for animals to walk through during normal outdoor activity; 5) easy to install and to move from one paddock or pasture to another.

SUMMARY OF THE INVENTION

The present invention substantially reduces or overcomes all of the above problems associated with the prior art. The invention is a low maintenance, electrically controlled automatic spraying device for delivering measured dosages of ectoparasiticides at a continuous and consistent dosage rate for the treatment of ectoparasites.

The invention may be employed wherever and whenever it is desired to treat a large group of animals and to prevent the increase number of new flies. For example, the invention may be used with a herd of livestock, a new group of animals being entered into an animal shelter, or pasture. The device is modular and portable and may be transported to any necessary location.

The automatic spraying device and method of treatment comprises at least one component for spraying solution for controlling ectoparasites. One possible embodiment comprises four-sided rail system defining an enclosure with an opening. Mounted on one rail side by the opening is a sensor and a nozzle for spraying the animal as it walks through the opening of the enclosure. The enclosure rest on the ground and can be placed anywhere in the pasture.

The preferred embodiment would be any type of fencing corral that has an opening in which the animals may enter. The subject invention can be used in conjunction with another invention of this inventor. A t-post style fence as commonly found on large farms may be adapted with a t-post bracket that can hold the sensor at any level the user desire. Therefore, the user does not necessarily have to built a separate enclosure from rails in order to practice this invention.

The animals are attracted to enter the enclosure by bait of food or water or any other suitable bait. At the opening of the enclosure is an infrared sensor. As an animal steps into the opening of the enclosure, the animal passes through the sensor to trigger spraying of the fluid. When the animal clears the opening, the liquid delivery system is automatically turned off. The automatic spraying device is adapted with a duration timer so the fluid is delivered to the nozzle for a certain period of time after the sensor is activated. The entire device can be wired with a presetable timer that can turn on/off the entire device for preset time periods.

The treatment solution is delivered to the nozzle by an application device having a pump and battery to provide the necessary power to the pump. The animal is exposed to the treatment solution every time the animal walks through the treatment nozzle of the automatic sprayer by entering or exiting the enclosure. The type of ectoparasiticides may be rotated at any time by the user and therefore minimize the risk of resistance development to the ectoparasiticides by ectoparasites. All voltages on the sprayer are twelve volts, which eliminates exposure of the animals to potential lethal voltages. The application device increases the efficacy and cost effectiveness of the treatment solution. A solar panel may be used to constantly recharge the battery to give continuous power.

The nozzle could be mounted in different positions to target bitting sites of different ectoparasite species. For example, stable flies bite on the feet, thus the nozzle would be mounted to aim at the feet of the animal.

In a preferred embodiment, the nozzle is mounted at a specific angle for spraying the body and legs of the animal. As an animal walks through the entrance the body is sprayed from the head to the end of the back. When treating dairy cattle, the nozzles are directed and pressurized so that little, if any, spray reaches the udder. When treating horses, it is known that the sound of the application device startles the horse. Therefore a solenoid valve may be connected to the application device to have the treatment solution ready to spray prior to the horse walking past the sensor. Thus, the pumping sound is not made and the horse is not scared to walk past the sensor and into the enclosure.

Accordingly, it is an object of the present invention to provide an automatic sprayer for treating animals against ectoparasites.

It is also an object of the present invention to provide an automatic sprayer that will have increased efficacy in the treatment of ectoparasites over traditional manual spraying.

It is also an object of the present invention to greatly increase the effectiveness of the insecticide by frequent spraying on a daily basis.

It is also an object of the present invention to greatly decrease the number of ectoparasites per animal by continuously spraying with a treatment solution.

It is also an object of the present invention to greatly reduce the cost of previous known manual spraying because using a lower dosage and the ability to set presetable timer.

It is also an object of the present invention to provide an automatic sprayer that will deliver treatment solution in small dosages to each animal as it passes through the automatic sprayer and also to control the amount of the dosage over time through a timer.

It is also an object of the present invention to assure that each animal is exposed to continuous dosage of the treatment solution every time the animal walks through the automatic sprayer.

It is also an object of the present invention to assure that the animals that are slowed due to discomfort and weakness from high numbers of ectoparasites infestations will receive the full, correct and proper dosage of treatment solution regardless of their condition.

It is also an object of the present invention to provide an automatic sprayer that eliminates the high level of management required for traditional treatment.

It is also an object of the present invention to provide a device that is both modular and portable for providing ease of placement at different locations for use in the field.

It is also an object of the present invention to rotate the type of ectoparasiticides and therefore minimize the risk of resistance development to by ectoparasites.

It is an advantage of this invention to provide a device that automatically treats animals in a voluntary manner, thereby significantly increasing efficacy of the treatment solution and reducing required time and costs of the farmer.

It is an additional advantage of this invention to provide a device for automatically delivering the correct and daily treatment solution dosage to each animal, each time the animal passes through the opening where the automatic sprayer is mounted.

Other objects and further scope of applicability of the present invention will become apparent from the detailed description given below. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWING

For a further understanding of the objects and advantages of the present invention, the preferred embodiment is described in the following detailed description with reference to the accompanying figures, in which like parts are given like reference numerals and wherein.

DETAILED DESCRIPTION OF THE INVENTION

Figure 1:
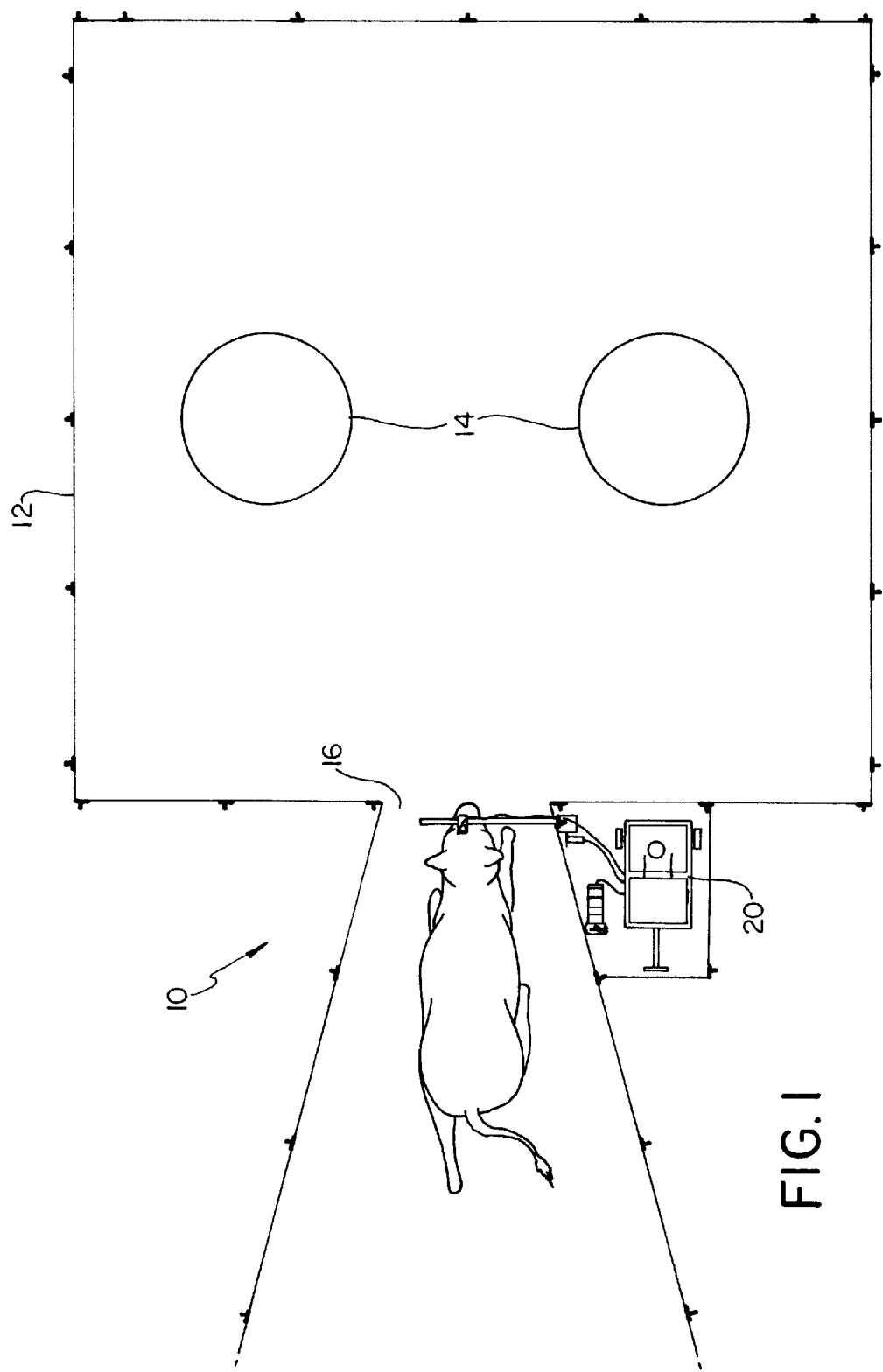
FIG. 1 is a pictorial diagram illustrating the preferred embodiment of the automatic sprayer in accordance with the present invention.

FIG. 1 illustrates the subject invention, 10, as in use by an animal. The enclosure 12 has four sides with one opening 16. The animals are drawn through the opening 16 by the bait 14. As the animal cross past the opening 16 the sensor (not shown in detail in this figure) is activated to trigger the application device 20 to pump ectoparasiticide into the nozzle 18 and thereby spray the animal. This invention can be constructed of a free standing enclosure such as a post and rail system, any type of fence that makes an enclosure or with a t-post, wire fence, or electric fence. The inventor prefers the t-post and wire fence as it is easy for the user to install and it is movable and portable. The inventor has also designed a bracket to be used on the t-post and to be used in conjunction with this invention.

Figure 2:
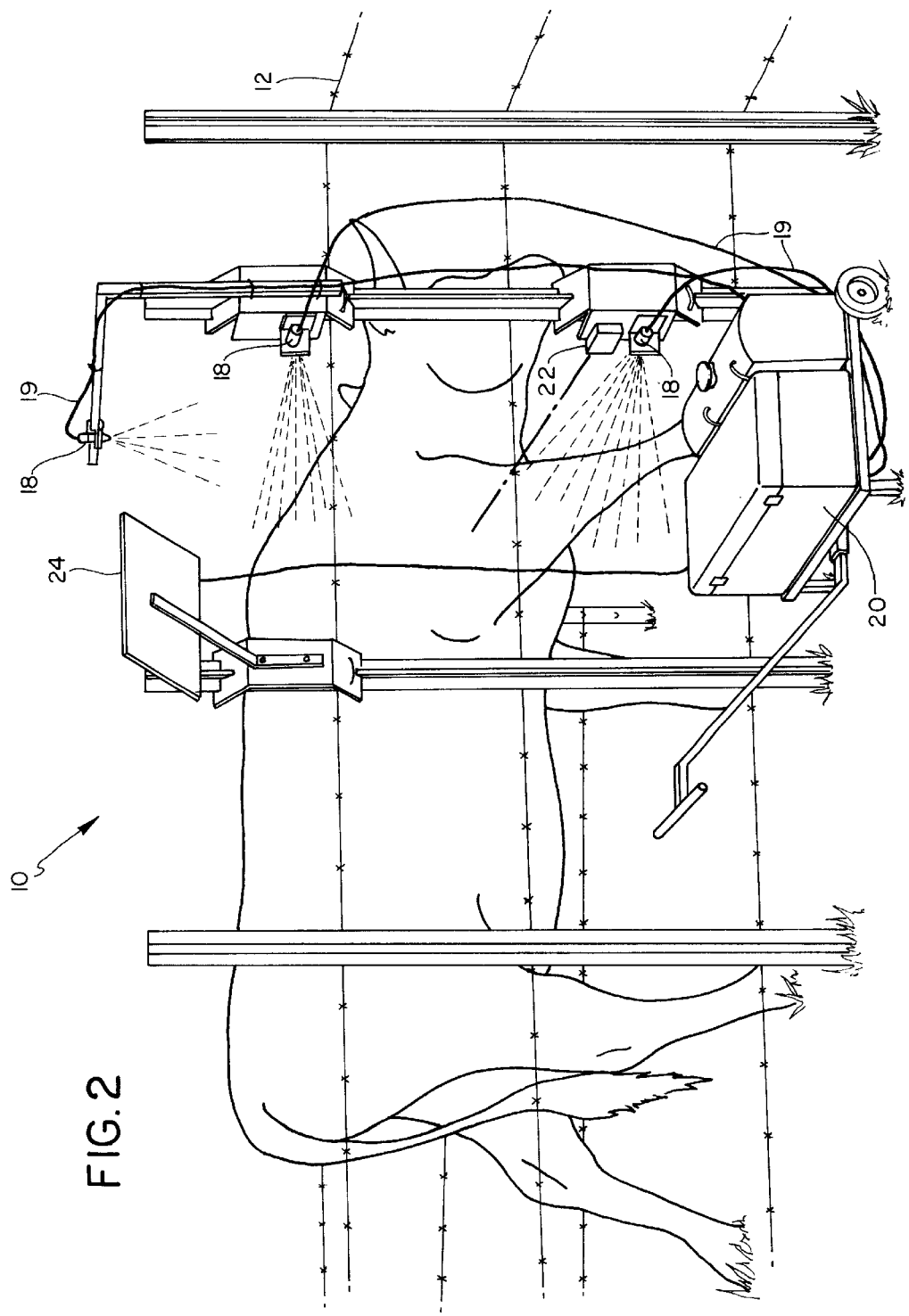
FIG. 2 is side view of the treatment of an animal showing three nozzles, one directed to the body of the animal and one directed to the legs of the animal and the third directed to the face and back of the animal.

FIG. 2 shows in more detail the application of the spraying of the animal. The nozzle 18 is aimed at the animal's legs or body, depending on the area to be treated. The nozzle 18 is connected to the application device 20 by way of tubing 19 that allows for the flow of treatment liquid from the application device 20 to the nozzle 18. The sensor 22 is activated by the animal passing in front of the sensor 22. When the sensor 22 is activated, it triggers the pump (not shown in this figure) to pump treatment liquid from the storage unit (not shown in this figure) from the application device 20 to the nozzle 18 which is then sprayed onto the animal as it passes by the opening of the enclosure. A solar panel 24 may be installed to give continuous recharging to a battery within the application device 20.

FIG. 2 also illustrates the t-post brackets invented by this inventor. The brackets are hung from the t-post and can be adjusted to any height desired. They are capable of holding the solar panel 24 and the nozzle 18 and the sensor 22. This is showing the preferred embodiment of the invention.

Figure 3:
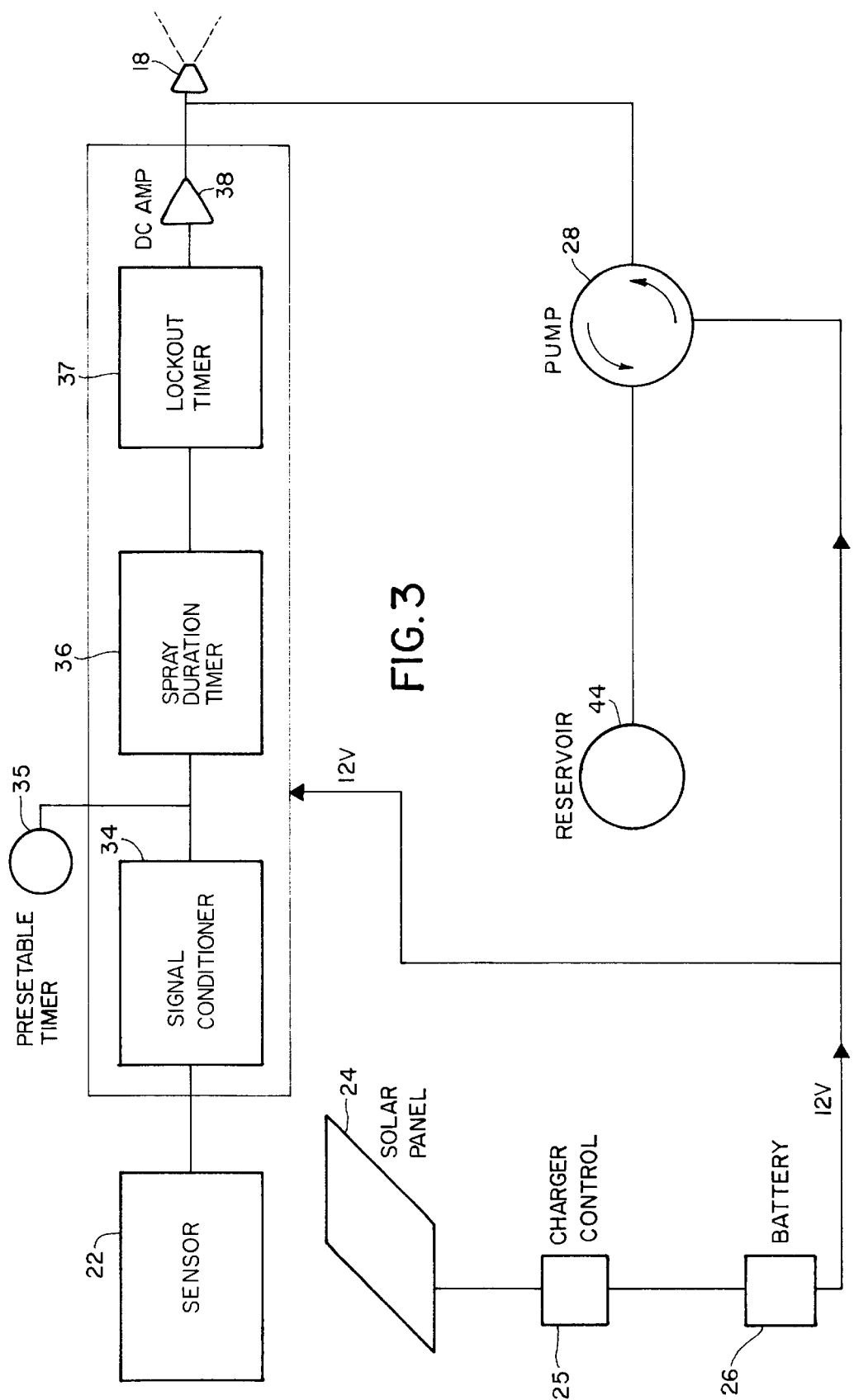
FIG. 3 is a flow chart diagram of the method of application of the treatment liquid when use in the preferred embodiment.

FIG. 3 is a flow chart diagram showing the electronic controls of the preferred embodiment of the subject invention as used with most animals. The sensor 22 when activated by the movement of an animal through the opening triggers the pump 28 to release the treatment liquid from the storage reservoir 44 through tubing to the nozzle 18. The pump 28 is powered by a power supply such as a battery 26 which may be continuously recharged by a solar panel 24. The sensor 22 is connected to a signal conditioner 34 which discriminates movement of debris and insects from animals so that the pump 28 is only activated when an animal passes through the opening. The DC Amp 38 turns the pump 28 on/off and is powered by the battery 26. A spray duration timer 36 may be connected in the circuitry to time the duration for which the pump 28 allows liquid to flow to the nozzle 18. The spray duration timer 36 is presetable for a predetermined amount of time. The presetable timer, 35 maybe connected to turn the entire system on/off at certain periods of time. A charge controller 25 is connected between the battery 26 and solar panel 24 to prevent the draining of battery 26 at night. Allowing the charge to only flow from the solar panel 24 to battery 26.

Figure 4A:
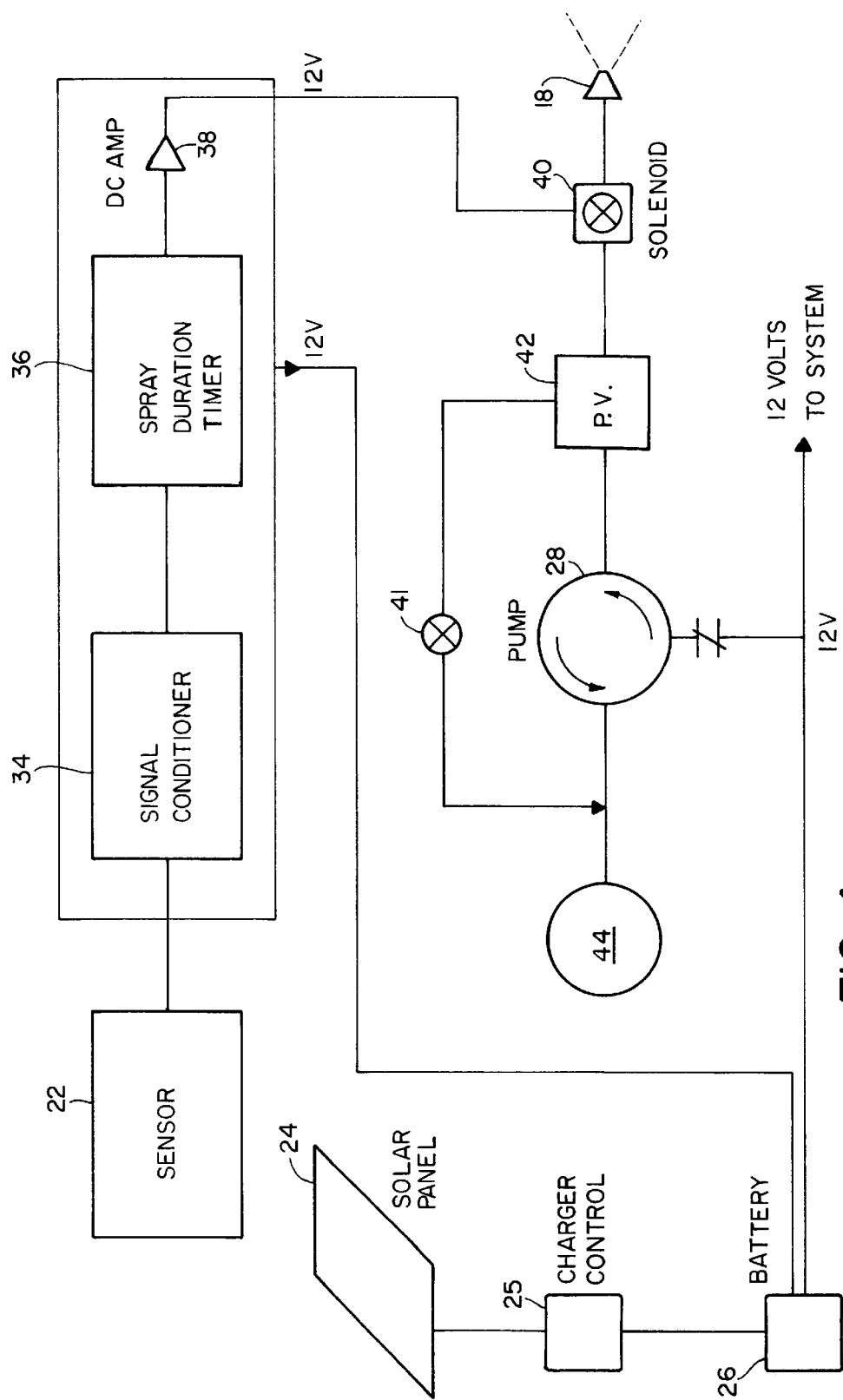
FIGS. 4a and 4b are flow chart diagrams of the method of application of the treatment liquid when used with an alternative embodiment.
Figure 4B:
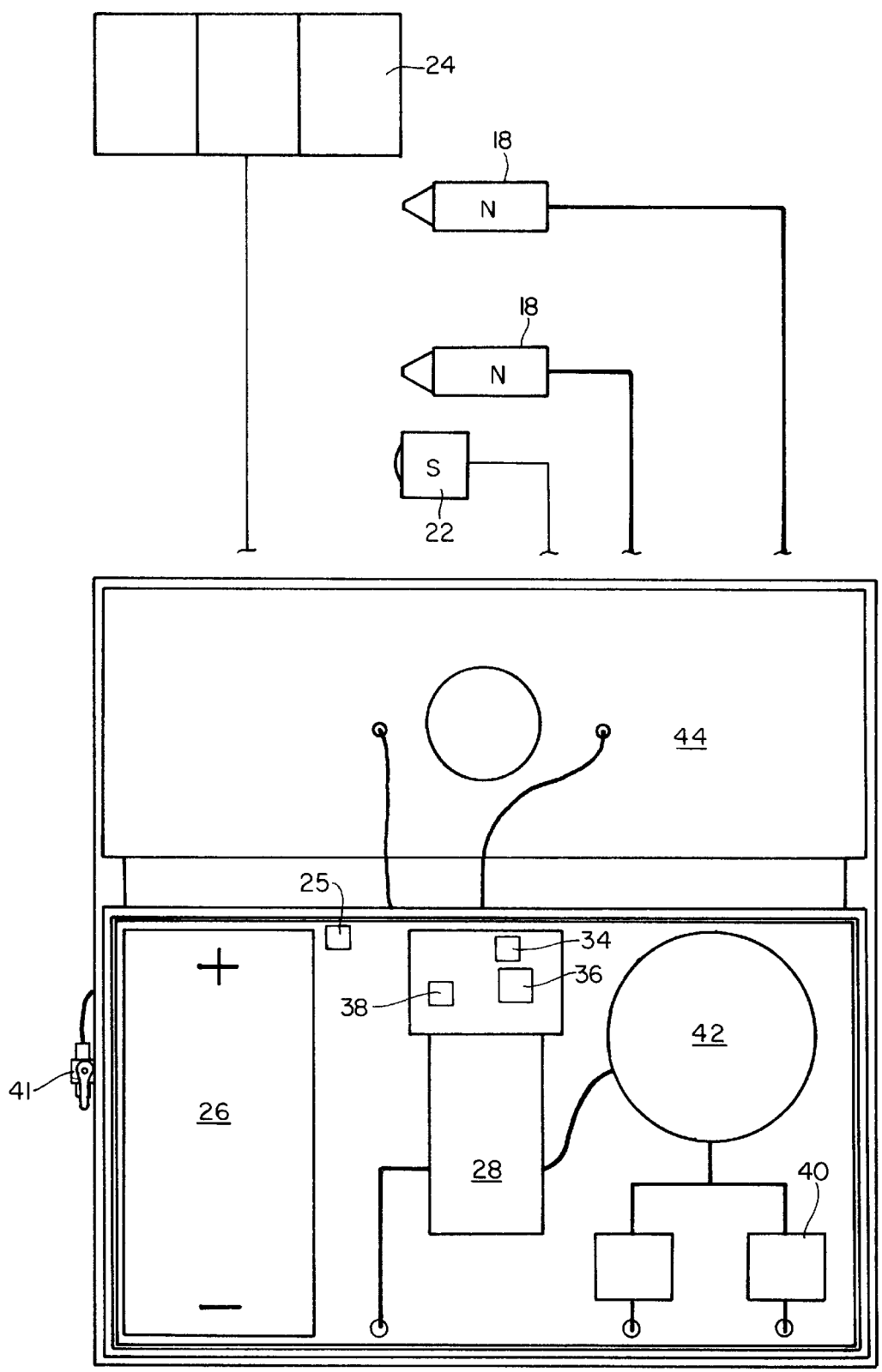

FIG. 4a and 4b show an alternative electronic control used especially when treating horses. The horses are startled by the sound of the pump 28 and when it is activated by the sensor 22 at the time they pass by the sensor 22 it can make the system ineffective as the horse may not pass into the enclosure. Therefore, an alternative system is shown in which the liquid treatment is pumped from the reservoir 44 into a pressure vessel 42 to be held until activation by the sensor 22. The sensor is connected to a signal conditioner 34. A DC Amp 38 turns the solenoid valve 40 on/off and is powered by the battery 26. A spray duration timer 36 may be connected in the circuitry to time the duration for which the solenoid valve 40 opens to allow the liquid to flow from the pressure vessel 42 to the nozzle 18. The battery 26 which is continuously recharged by a solar panel 24 provides the power to the entire system. When a horse passes through the opening, the animal does not hear the sound of the pump 28 as the treatment liquid is under pressure held in the pressure vessel 42 and released directly from the pressure vessel 42 through the solenoid valve 40 and to the nozzle 18 onto the animal. The DC Amp 38 turns the solenoid valve on or off. A purge valve 41 is attached between the reservoir 44 and the pressure vessel 42 to open and release pressure in the pressure vessel 42 and close to build up pressure in the pressure 42 thereby priming the system.

What is claimed is:

1. An automatic spraying device for delivering dosages of ectoparasiticides at least two times on a daily basis and at consistent dosage rate for the control of ectoparasites on animals comprising a modular, portable free standing fenced enclosure for holding at least one animal in a confined area having at least one opening;

a bait source place within the fenced enclosure to attract the animal into the fenced enclosure;

a sensor mounted by the opening to detect the movement of said animal through the opening upon entering the fenced enclosure or upon exiting the fenced enclosure;

a signal conditioner component connected to said sensor to discriminate the detection of debris and insects from the animal;

a storage compartment adapted to hold a reservoir tank, a power supply and a pumping unit that is triggered upon a signal from the signal condition of the detection of the animal after activation of the sensor;

wherein said reservoir tank contains ectoparasiticide;

at least one nozzle mountable in different positions to target biting sites of different ectoparasite species and aimed towards the opening to deliver said ectoparasiticide from said reservoir tank through tubing to said nozzle and onto a specific body part of the animal as it passes through said opening upon either entering the fenced enclosure or exiting the fenced enclosure;

wherein the specific body part of the animal may be the underside of the animal; and a spray duration timer to set duration of delivery of the ectoparasiticide to the nozzle.

2. An automatic spraying device as claimed in claim 1 further comprising a solar panel to continuously recharge said power supply.

3. An automatic spraying device as claim in claim 1 further comprising a pressure vessel to hold the ectoparasiticide under pressure from the reservoir tank to be delivered at a delay after pumping into the pressure vessel; and a solenoid valve to release the ectoparasiticide onto the animal when the animal passes through the opening.

4. An automatic spraying device as claimed in claim 1 further comprising a presetable timer to set the on/off control of the entire device.

5. A method of treating animals against ectoparasites with an automatic spraying device comprising the steps of providing a modular, portable free standing fenced enclosure for animals with at least one opening;

baiting the animals into said enclosure which eliminates labor necessary in herding the animals;

mounting a sensor device by said opening to detect the movement of an animal through the opening to spray said animals as they pass into the opening for the bait or as they leave said enclosure;

providing a storage compartment for a reservoir tank, a power supply and a pumping unit that is triggered upon activation of the sensor;

storing ectoparasiticide in said reservoir tank;

connecting by way of tubing the reservoir tank to the pumping unit and then to at least one nozzle mountable in different positions to target biting sites of different ectoparasite species to deliver said ectoparasiticide from said reservoir tank onto an animal as it passes through the opening.

6. A method of treating animals against ectoparasites with an automatic spraying device as claimed in claim 5 further comprised of wiring a solar panel to the power supply to continuously recharge said power supply.

7. A method of treating animals against ectoparasites with an automatic spraying device as claimed in claim 5 further comprised of providing a pressure vessel to hold the ectoparasiticide under pressure awaiting activation of the sensor; and attaching a solenoid valve between the pressure vessel and the nozzle to release the ectoparasiticide onto the animal at a delay after pumping into the pressure vessel.

8. A method of treating animals against ectoparasites with an automatic spraying device as claimed in claim 5 further comprised of connecting a presetable timer into circuitry to set an on/off control of the entire treatment method.

* * * * *